Patented Apr. 26, 1938

2,115,411

UNITED STATES PATENT OFFICE 2,115,411

PREPARATION OF YERBA MATÉ

Joseph Cortez, New York, N. Y., assignor to Clarence H. Venner, Jr., New York, N. Y.

No Drawing. Application June 26, 1935,
Serial No. 28,455

7 Claims. (Cl. 99—28)

This invention relates to the preparation of yerba maté, a South American food commodity to which the names of Paraguayan tea, Brazilian tea and South American tea are also given; technically it is known as *Ilex Paraguayensis* St. Hill of which there are over sixty species, twenty of them being considered most suitable for human consumption.

My invention is applicable to all varieties of yerba maté and has for its object the preparation of edible yerba maté products, in either fluid, solid or concentrated form, which exhibit to an enhanced degree the physiological and pharmacodynamic properties of the natural plant and are far superior thereto from the standpoint of solubility, odor, taste, color and general appearance.

Yerba maté appears in world markets in the form of crushed, roasted leaves and twigs, resembling ordinary green tea, and is used as a beverage somewhat like tea. Although it resembles green tea, it is generally accepted that in order to obtain the true beverage possessing intrinsic physiological value yerba maté must be brewed in a different manner than ordinary teas and coffees. It is also commonly accepted that this difference in brewing procedure is necessary because of the peculiar solubility characteristics of the chemical constituents of yerba maté. In fact for more than a century a very rudimentary and primitive method, devised by the Indians or natives of the countries where the commodity is produced, has been and still is used and accepted as the only method suitable for the brewing of yerba maté.

This primitive method involves the use of a dried gourd, hollowed out, with an aperture into which pulverized yerba maté is placed and compressed, in amounts varying from one to one and one-half ounces or more, and over which boiling water is poured little by little, ten to fifteen minutes being required before the decoction becomes ready for consumption. The resulting percolate is then sucked through a special hollow tube called "bombilla", at first and at times even now made of a reed or bone, but usually fashioned from non-rusting metals such as gold, silver or plated materials with a perforated spoon-shaped expansion at the extremity inserted into the gourd. The decoction thus prepared appears as a turbid, yellow-greenish liquid of bitter taste and unpleasant flavor which has none of the attributes of a delicious tea and is far from pleasing to the average person who tastes it for the first time. It is because of this disagreeable taste, appearance, etc., and the difficulty and expense involved in its preparation, that yerba maté has been denied the popularity to which its recognized physiological and pharmacodynamic properties would otherwise entitle it.

Numerous attempts have been made to overcome the disagreeable characteristics of yerba maté referred to above. Various special roasting methods have been tried without success. It has also been proposed to subject yerba maté to fermentation and maceration processes similar to those employed in the manufacture of black and green teas. The isolation of the essential oils by distillation so as to correct the objectionable odors, and the blending of yerba maté with dried aromatic flowers, barks, teas and other materials, have also been proposed. The reduction of yerba maté to a finely pulverized state to increase its solubility, aging methods, curing processes and other forms of treatment have also been considered but these have all been unsuccessful and have never come into commercial use.

My invention includes the treatment of yerba maté with alkaline substances of an edible nature in such manner as to effect changes in the hydrogen-ion concentration of the natural juices of the plant and to render them more readily soluble, clear and concentrated. In my process I also saponify the essential oils which are known to impart a disagreeable odor and flavor to yerba maté products, care being taken to avoid the partial or total destruction of the physiological value or pharmacodynamic properties of the plant and to avoid excessive changes in the color or appearance of the commodity when used in the form of a tea. My invention also has other important advantages, particularly as it permits yerba maté to be flavored according to the psychology of each individual market, permits it to be packed and dispensed in tea bags or balls like ordinary tea and brewed in ordinary percolating apparatus, and finally permits the manufacture of yerba maté extracts and concentrates possessing intrinsic physiological value, something hitherto impossible, and for which search has repeatedly been made.

It is known that yerba maté, besides the alkaloid mateine and the same chemical constituents as coffee and teas, contains a great number of mineral salts which are readily assimilable, such as for example, sodium, calcium, potassium, magnesium, iron, manganese, lithium and others, and that these mineral elements as found in yerba maté and other vegetable foods are intimately concerned with the maintenance of bodily processes and thus are essential for the support and maintenance of the normal physiology of animals including man. A. Moreau de Tours in his treatise "Le Maté" dealing with the etiology, botany, chemistry, physiology and pharmacodynamic properties of yerba maté, states that most of the beneficial effects which people derive from the use of yerba maté beverages flow from the fact that the centesimal analysis of its soluble mineral constituents is very closely related chemically to that of the natural saline waters of Vichy. Scientific investigations conducted in other European countries as well as in South America where the commodity is produced agree with this view and also confirm the belief that yerba maté is a healthier beverage than coffee or tea because it contains less essential oils and more resins and extractive substances than either of these more common beverages. Yerba maté is in fact considered the better beverage in South America, where its annual consumption amounts to nearly five hundred million pounds, and in some of the European countries where the commodity has been investigated.

Heretofore it has not been definitely known that the physiological value and pharmacodynamic properties of yerba maté and its derivatives depend upon other chemical substances resulting from chemical disintegration and structural rearrangement of the coloring matter which takes place during the initial roasting operations to which the commodity is subjected during the first stages of its manufacture. This coloring matter, as found in the commercial product known as yerba maté, consists of chlorophyll A., chlorophyll B., alpha and beta carotene, xanthophyll, anthocyanins and the enzyme chlorophyllase. Consequently the development of the proper method of treatment was prevented. It was first supposed that the mineral salts alone, and these mineral salts in combination with the alkaloid mateine, nitrogenous substances and other substances found in the plant, except those resulting from the disintegration and rearrangement of the coloring matter, were the only substances responsible for the physiological value and pharmacodynamic properties of the plant. But I have found that such is not the case; and this can be attested by the fact that when these compounds are fed alone or in combination to experimental animals they do not possess the same physiological properties as observed when the same compounds are fed along with the products of decomposition of the coloring matter referred to above. Furthermore, it has not been recognized heretofore that the carbonic acid free and combined which is known to exist in the soluble mineral constituents of yerba maté acts as a buffer which prevents the further disintegration and structural rearrangement of the chlorophyll and other coloring materials; nor was it known previous to my discovery that by neutralizing the buffering action of the carbonic acid within the cells of the leaves and twigs of yerba maté as by means of alkaline substances the reactions chemical or physical can be accelerated and thus the quantity of these compounds substantially increased in the commodity.

Referring again to the subject of physiology and pharmacodynamics of yerba maté it has been found that when the mineral salts contained in the plant are fed to experimental animals, no palpable stimulation of the heart, respiratory, neuro-vascular, cardio-vascular or haematopoietic organs is noticed, their effect being mostly limited to the excretory organs of the animal; but, on the other hand, when these mineral salts are allowed to enter into combination with the chlorophyll and other coloring substances of yerba maté whether in vitro or within the plant cells and fed to experimental animals, a palpable stimulation of the above mentioned organs is evidenced; first, by a different histological picture of the haematopoietic organs, spleen, liver, marrow of the bones, second by variations in the index of oxygen absorption and carbon dioxide elimination, finally by stimulation of that region of the nervous system described as the vague and sympathetic system, and ultimately by regulation of the pressure of the blood. While I do not rest the present invention upon any theory, I give it as my belief that the effect of treating yerba maté by means of alkaline substances of a nontoxic nature as herein described, whether in vitro or within the cells of plants, gives origin to the formation of complex chlorophyll derivatives or compounds which in some manner cause them to exert stimulating action on the various organs of the body previously mentioned and makes them function properly. In this respect, these compounds may disintegrate within the body and lead to the formation of more complex compounds which these organs utilize. However, I do not exclude the possibility that these effects may be produced by further structural rearrangement in some other compound or compounds obtained in constituent materials of yerba maté.

According to my invention yerba maté may be rendered activated and concentrated by subjecting the commodity as it now appears in world markets to the action of alkaline substances of an edible nature; the activation, for instance, is readily effected by means of bicarbonates such as those found in the plant itself, including those of sodium, magnesium, potassium and calcium, or other sources of alkalinity provided they be of an edible nature may be employed in effecting the activation and concentration.

As an example: One kilogram of yerba maté is first thoroughly cleaned by dry methods and freed of all dust, sand, foreign impurities or vegetable matter which may happen to be present. The cleaning operations can be carried out most efficiently by means of standard equipment similar to that employed in the cleaning of ordinary teas. The commodity is then placed in a strainer or moistening apparatus and treated for three to five minutes with a weak solution of sodium bicarbonate or any other water-soluble bicarbonate, care being taken that the bicarbonates or alkaline substances employed for this activation be of tested purity. In practice the type of alkaline substances of edible nature standardized by the American Chemical Society have been found to be most suitable for the purpose. The strength of the solution employed varies between 0.25 to 1.10 percent and the amount of the solution used is immaterial provided each and every particle of yerba maté comes in contact with the solution for the length of time specified. In this connection, I desire to point out that inasmuch as the solution is taken up by the leaves and twigs only through the edges, cracks, apertures or points where broken cells appear, the physical state of the commodity has a bearing on the strength of the solution employed as well as the time required for activation and concentration; in fact, the finer the particles, the less strength and time are required, and vice-versa. In general, however, I have found that the so-called "Paraguayan" types of yerba maté may usually be treated with solutions of 1 percent alkalinity for three minutes time; the so-called "Argentine" types requiring solutions of 0.90 percent and 4 minutes time, and the so-called "Brazilian" types requiring solutions up to 1.10 percent and 5 minutes time. Solutions should be employed only once, a fresh solution being required for each batch of the commodity to be activated and concentrated. Once the activation-concentration operation has been concluded, the commodity thus treated is preferably transferred to a drying machine and dried at a mild temperature, or it may be dried in the sun; the quantity of moisture to be left in the commodity preferably being the same as it was before the treatment was undertaken.

The product resulting from the above process possesses all the beneficial properties of yerba maté in concentrated form and is ready to be flavored to suit the taste and psychological requirements of the various markets or localities where the commodity is to be sold and consumed. One part of the product thus processed represents and possesses the same physiological value and pharmacodynamic properties as ten parts of the raw or unprocessed commodity, and the beverages, extracts or concentrates produced from it are free from objectionable odor, color and taste. Such product can therefore be dispensed in the same manner as ordinary tea, packed in small cotton bags or balls. One pound of my processed commodity yields 250 cups of the beverage, so that when it is packed in the form of "tea-balls" it should be packed at the rate of 250 balls to the pound. On the other hand, when percolators are used a leveled teaspoonful should be used for each cup of the beverage to be served. In both cases a steeping time of from three to five minutes suffices to obtain the true beverage. The commodity processed as herein described may be roasted in the same manner as ordinary coffee and the beverage thereby obtained is far superior as regards brewing, flavor and other qualities than is the case when unprocessed yerba maté is subjected to similar roasting operations. Referring again to the subject of flavors and flavoring of the processed commodity, I have found in practice that the best results are obtained by the use of natural essential oils distilled and cold pressed combined, as in this way the flavor is retained longer by the commodity. For example a combination of three distilled oils and two cold pressed oils is better suited for the purpose than combinations of five distilled oils or five cold pressed oils. A more or less agreeable orange pekoe flavor can be imparted to the commodity and the beverages, extracts or concentrates derived therefrom by using the following or similar combinations: distilled oil of Ceylon cinnamon 0.13 kilogram, distilled oil of cloves 0.13 kilogram, distilled oil of nutmegs 0.13 kilogram, cold pressed oil of lemons 2.60 kilograms, and cold pressed oil of sweet oranges 3.90 kilograms. This quantity of flavoring material has been applied very successfully to 200 kilograms of the processed yerba maté. The amount of flavor to be used as well as the most suitable type of flavoring materials depends on the taste or idiosyncracies of the consuming public. The physiological value and pharmacodynamic properties of the processed commodity do not suffer impairment by flavoring, but I find it advisable in all cases to employ natural essential oils and not synthetic aromatic chemicals or the like. The application of the flavoring materials to the processed commodity is most efficiently carried out by spraying it with oils which have previously been blended; curing and aging of the commodity after flavoring is also desirable to obtain mellowness. The type of flavor to be imparted to the commodity, the quantity to be used and the manner in which the flavoring operations are carried out and other factors in this connection may be readily determined by those skilled in the art in view of the explanation given above; and in actual practice processed yerba maté may be subjected to tests from time to time to insure proper manufacture.

According to my invention yerba maté may be prepared in other forms than a tea type of beverage. I have found for example that active yerba maté extracts and concentrates possessing intrinsic physiological value can be prepared from the processed comomodity and then incorporated in foods, food-medicines, pharmaceuticals and beverages, such as for example, biscuits, pastries, pies, desserts, candies, chocolates, ice-cream, syrups, cordials, wines and liquors; breakfast foods, powdered milk, malt, yeast, chewing gums, sauces, carbonated beverages; also in such medicines and pharmaceutical products and prescriptions as elixirs, fluid extracts, syrups, tablets, pills, wafers, granulates and so forth.

Referring again to the subject of extracts and concentrates, the United States, British, German, Brazilian, Argentinian, Paraguayan and French pharmacopoeias, as well as most of the standard formularies and text books on pharmacy, make provision for the removal of the green coloring matter from the extracts of medicinal plants and vegetable matter. This coloring matter is generally spoken of as "ballast substance" which should be removed during the so-called purification or refining operations; most South American text-books make such provision for extracts of yerba maté. However, extracts of yerba maté whether fluid, solid or concentrated, when treated in such manner do not possess all the physiological value and pharmacodynamic properties which the plant is known to possess and for this reason it is essential that the commodity be treated according to my process before the extracting operations are carried out. Hence the manufacture of yerba maté extracts from the processed commodity can readily be carried out along the same lines outlined for medicinal plants and vegetable matter of edible character except that the coloring matter should not be removed from the extracts. The time and manner of extraction, the apparatus or equipment required or employed for the performance of such extracting operations do not affect the quality of the extracts resulting therefrom, provided the material is treated by my process as previously described before the extracting operations are performed. The best results in the manufacture of whole extracts of yerba maté are obtained by first reducing the ordinary commercial yerba maté to a finely pulverized state, then processing the pulverized material according to my invention as described above, and finally treating the product with the most suitable type of solvents and extracting apparatus. As an example, the manufacture of a type of whole yerba maté extract to be used in chewing foods can be carried out as follows:

1 kilogram of finely pulverized yerba maté is treated according to my process, the powdered material is allowed to dry and then placed in a suction extractor and extracted with 7 liters of ethyl alcohol until exhausted, that is to say until no more colored material can be extracted by such method of treatment. The resulting liquor is then filtered through paper twice until all precipitates are removed, the clear liquor freed from ethyl alcohol by distillation, concentrated and finally dried out at a mild temperature or in vacuum until it can be converted into a powder, or if desired until of a syrupy consistency suitable for manufacturing into lumps. The powder, for example, is made to a fixed weight with a suitable vehicle such as milk sugar, or it may be immediately incorporated in a suitable formula. This extract is not readily soluble in water, but in practice it has proven to be readily assimilable and to possess all the desirable properties of the plant. Its applications cover a wide range in the food and pharmaceutical industries, being capable of incorporation in different formulae as occasion requires. As an example, the following formula represents a general tonic, stimulant and haematinic:

| | Milligrams |
|---|---|
| Whole yerba maté extract | 10 |
| Extr. macrocystis pyrifera | 10 |
| Extr. calf liver powder | 20 |
| Malted milk | 1.080 |

The above materials are mixed and pressed into a chewing tablet to be administered in doses of from two to three tablets three times a day. In like manner other formulae can readily be worked out by those skilled in the art.

The whole water soluble extracts also cover a wide range of application in the food, beverage and pharmaceutical fields and these can best be prepared by treating the commodity according to my process and as outlined in the case of the extract described above and then extracting it twice and for about 40 minutes with 4 parts of boiling water, the resulting infusion then being percolated, filtered and evaporated to the desired consistency or evaporated to dryness until it can be converted into a powder and mixed with a suitable vehicle of fixed weight. All such whole extracts can be further refined, purified or fractioned depending upon the circumstances and the uses to which they are to be put. I have also found that by suitable fractionation methods, purification and the like, the alkaloid mateine can be isolated, or the active mineral constituents in the form of chlorophyll derivatives obtained.

The invention is also capable of many other modifications and adaptations within the scope of the appended claims.

The invention claimed is:

1. Process of treating yerba maté which comprises thoroughly wetting the leaves and twigs of the plant with a solution of an edible alkaline substance and then drying same.

2. Process of treating yerba maté which comprises subjecting the leaves and twigs of the plant to the action of a .25 to 1.10% solution of an edible alkaline substance for three to five minutes and then drying same.

3. Process of treating yerba maté which comprises subjecting the leaves and twigs of the plant to the action of a .25 to 1.10% solution of a water-soluble bicarbonate for three to five minutes and then drying same.

4. Process of treating yerba maté which comprises subjecting the leaves and twigs of the plant to the action of an edible alkaline solution and then drying same at a mild temperature until the moisture content is substantially the same as in the original plant.

5. Process of treating yerba maté which comprises subjecting the leaves and twigs of the plant to the action of a .25 to 1.10% solution of a water-soluble bicarbonate for three to five minutes and then drying same at a mild temperature until the moisture content is substantially the same as in the original plant.

6. Process of preparing yerba maté extract which comprises subjecting the leaves and twigs of the plant to the action of an edible alkaline solution, drying same, extracting the active principles from the treated material, filtering the resulting liquor, and concentrating the filtrate.

7. Process of preparing yerba maté extract which comprises pulverizing the leaves and twigs of the plant, subjecting the pulverized material to the action of a .25 to 1.10% solution of a water-soluble bicarbonate for three to five minutes, drying same, extracting the dried material with ethyl alcohol until exhausted, filtering the resulting liquor, distilling the filtrate, and concentrating the remainder from the distillation.

JOSEPH CORTEZ.